(12) United States Patent
Essiambre et al.

(10) Patent No.: US 10,585,237 B2
(45) Date of Patent: Mar. 10, 2020

(54) MULTIMODE OPTICAL FIBER, MODE DELAY ADJUSTER FOR FIBER SYSTEMS, AND METHODS TO USE SUCH FIBERS, ADJUSTERS, AND SYSTEMS

(71) Applicant: Alcatel Lucent, Boulogne-Billancourt (FR)

(72) Inventors: Rene'-Jean Essiambre, Red Bank, NJ (US); Roland Ryf, Aberdeen, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 39 days.

(21) Appl. No.: 15/676,558

(22) Filed: Aug. 14, 2017

(65) Prior Publication Data

US 2018/0372945 A1 Dec. 27, 2018

Related U.S. Application Data

(62) Division of application No. 13/539,371, filed on Jun. 30, 2012, now Pat. No. 9,759,860.

(Continued)

(51) Int. Cl.
*G02B 6/028* (2006.01)
*H04J 14/04* (2006.01)
(Continued)

(52) U.S. Cl.
CPC ....... *G02B 6/0288* (2013.01); *G02B 6/02214* (2013.01); *G02B 6/2861* (2013.01); *H04J 14/04* (2013.01); *G02B 6/0281* (2013.01)

(58) Field of Classification Search
CPC .... G02B 6/0288; G02B 6/02214; G02B 6/14; G02B 6/2861; H04J 14/04
(Continued)

(56) References Cited

U.S. PATENT DOCUMENTS 5,473,719 A 12/1995 Stone
6,363,195 B1 * 3/2002 Abbott, III ......... G02B 6/02214
385/123

(Continued)

FOREIGN PATENT DOCUMENTS

JP H07-212304 A 8/1995
JP 2008-203837 A 9/2008
(Continued)

OTHER PUBLICATIONS

PCT International Search Report, PCT/US2013/027266, International Filing Date Feb. 22, 2013, 3 pgs.
(Continued)

*Primary Examiner* — Michael Stahl

(57) ABSTRACT

An apparatus includes a multi-mode optical fiber having a selected plurality of optical propagating modes. The selected plurality may include only a proper subset of or may include all of the optical propagating modes of the multi-mode optical fiber. Each optical propagating mode of the selected plurality has a group velocity that varies over a corresponding range for light in, at least, one of the optical telecommunications C-band, the optical telecommunications L-band, and the optical telecommunications S-band. The ranges corresponding to different ones of the modes of the selected plurality are non-overlapping. The ranges of a group velocity-adjacent pair of the ranges are separated by a nonzero gap of less than about 10,000 meters per second.

10 Claims, 6 Drawing Sheets

Related U.S. Application Data

(60) Provisional application No. 61/634,784, filed on Mar. 5, 2012.

(51) Int. Cl.
*G02B 6/02* (2006.01)
*G02B 6/28* (2006.01)

(58) Field of Classification Search
USPC ....... 385/28; 359/337, 337.4, 337.5; 398/53, 398/140, 147–150
See application file for complete search history.

(56) References Cited

U.S. PATENT DOCUMENTS

| | | | |
|---|---|---|---|
| 8,355,638 | B2 | 1/2013 | Essiambre et al. |
| 8,391,655 | B2 | 3/2013 | Ryf |
| 8,538,275 | B2 | 9/2013 | Essiambre et al. |
| 8,582,933 | B2 | 11/2013 | Ryf |
| 8,822,905 | B2 | 9/2014 | Ryf |
| 9,759,860 | B2 * | 9/2017 | Essiambre .............. H04J 14/04 |
| 9,778,418 | B2 * | 10/2017 | Essiambre .............. G02B 6/268 |
| 2003/0147585 | A1 | 8/2003 | Kikuchi et al. |
| 2010/0303428 | A1 | 12/2010 | Bickham et al. |
| 2010/0329693 | A1 | 12/2010 | Chen |
| 2011/0243574 | A1 | 10/2011 | Essiambre et al. |
| 2011/0293290 | A1 | 12/2011 | Gholami et al. |
| 2012/0224863 | A1 * | 9/2012 | Winzer ................... G02B 6/14 398/158 |
| 2013/0216181 | A1 * | 8/2013 | Bickham ................ G02B 6/268 385/28 |
| 2013/0230319 | A1 * | 9/2013 | Essiambre ........... G02B 6/0288 398/44 |
| 2014/0079392 | A1 * | 3/2014 | Essiambre ........... G02B 6/0288 398/44 |
| 2019/0049661 | A1 * | 2/2019 | Essiambre ........... G02B 6/0288 |

FOREIGN PATENT DOCUMENTS

| | | |
|---|---|---|
| JP | 2011-170353 A | 9/2011 |
| JP | 2012-63697 A | 3/2012 |
| KR | 10-2011-090992 A | 8/2011 |
| WO | WO-2011-126814 A2 | 10/2011 |

OTHER PUBLICATIONS

Mumtaz, Sami et al., "Reduction of Nonlinear Penalties due to Linear Coupling in Multicore Optical Fibers", J. of Latex Class Files, vol. 6, No. 1, Jan. 2007, pp. 1-3.

Ryf, R., U.S. Appl. No. 13/200,072, filed Sep. 16, 2011, "Optical Mode Couplers for Multi-Mode Optical Fibers", 33 pgs.

Ryf, R., U.S. Appl. No. 12/827,284, filed Jun. 30, 2010, "Waveguide Coupler for Optical Transverse-Mode Multiplexing", 30 pgs.

Essiambre, R-J. et al., U.S. Appl. No. 12/492,391, filed Jun. 26, 2009, "Receiver for Optical Transverse-Mode-Multiplexed Signals", 51 pgs.

Ryf, R., U.S. Appl. No. 12/986,468, filed Jan. 7, 2011, "Scalable Waveguide-Mode Coupler for an Optical Receiver or Transmitter", 25 pgs.

Essiambre, R-J. et al., U.S. Appl. No. 12/827,641, filed Jun. 30, 2010, "Multimode Optical Communication", 46 pgs.

Mansour, Ayman M. et al., Fiber Modes [Theory and Simulation], University of Jordan, College of Engineering, Electrical Engineering Department, EE-0903729 Selected Topics in Communication (Optical communication), Project Report, Fall-2005/2006, 50 pgs.

Gloge, D. et al., "Multimode Theory of Graded-Core Fibers", AT&T, The Bell System Technical Journal, vol. 52, No. 9, Nov. 1973, pp. 1563-1578.

Okamoto, Katsunari et al., "Analysis of Wave Propagation in Optical Fibers Having Core With α-Power Refractive-Index Distribution and Uniform Cladding", IEEE Transactions on Microwave Theory and Techniques, vol. MTT-24, No. 7, Jul. 1976, pp. 416-421.

Essiambre, R-J. et al., U.S. Appl. No. 15/676,449, filed Aug. 14, 2017, Multimode Optical Fiber, Mode Delay Adjuster for Fiber Systems, and Methods to Use Such Fibers, Adjusters, and Systems, 30 pages.

* cited by examiner

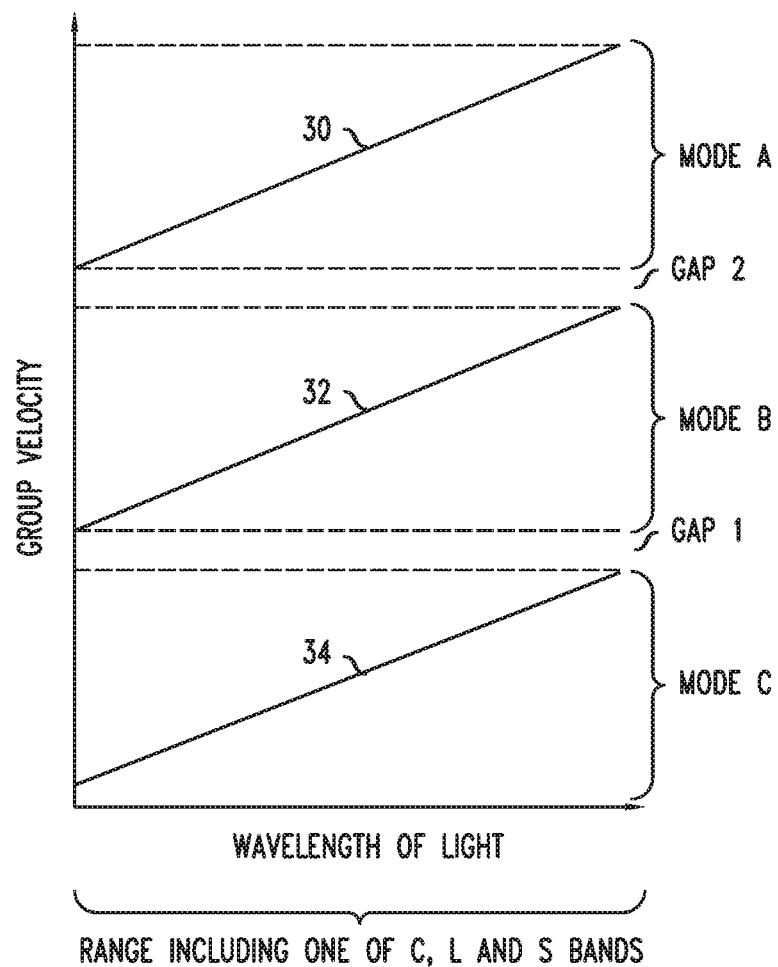

FIG. 6

```
┌─────────────────────────────────────────────────────┐ ⎯ 62
│   FOR A SEQUENCE OF WAVELENGTH CHANNELS, MODE       │
│        MULTIPLEXING LIGHT OF Q DATA-MODULATED        │
│   OPTICAL CARRIERS TO Q CORRESPONDING OPTICAL        │
│   PROPAGATING MODES OF A MMF OR MODE-DEMULTIPLEXING  │
│   THE LIGHT FROM THE N MODES TO Q CORRESPONDING      │
│   OPTICAL CARRIERS, CENTER WAVELENGTHS OF THE        │
│   CHANNELS SPANNING AN INTERVAL OF, AT LEAST, THE    │
│   C, L, OR S BAND, EACH MODE HAVING A GROUP          │
│   VELOCITY WHOSE LIMIT VALUES OVER THE INTERVAL      │
│   DEFINE A MODE-BAND, NEIGHBORING PAIRS OF THE       │
│   MODE-BANDS BEING SEPARATED BY A NON ZERO GAP       │
│       OR LESS THAN ABOUT 10,000 METERS PER SECOND    │
└─────────────────────────────────────────────────────┘
                          │                            ⎯ 64
┌─────────────────────────────────────────────────────┐
│      PROPAGATING THE LIGHT THROUGH THE LENGTH OF THE MMF │
└─────────────────────────────────────────────────────┘
                          │                            ⎯ 66
┌─────────────────────────────────────────────────────┐
│   OPTIONALLY, OPTICALLY COMPENSATING THE LIGHT TO REMOVE │
│   DIFFERENTIAL MODE DELAY PRODUCED BY PROPAGATION OF THE │
│   LIGHT THROUGH THE LENGTH OF THE MULTIMODE OPTICAL FIBER │
└─────────────────────────────────────────────────────┘
```

60

MULTIMODE OPTICAL FIBER, MODE DELAY ADJUSTER FOR FIBER SYSTEMS, AND METHODS TO USE SUCH FIBERS, ADJUSTERS, AND SYSTEMS

This application is a divisional of U.S. application Ser. No. 13/539,371, filed Jun. 30, 2012, and also claims the benefit of U.S. provisional application No. 61/634,784, filed Mar. 5, 2012.

BACKGROUND

Technical Field

The inventions relate to multimode optical fibers, devices useable with or including multimode optical fibers, and methods to use such fibers and devices.

Discussion of the Related Art

This section introduces aspects that may be helpful to facilitating a better understanding of the inventions. Accordingly, the statements of this section are to be read in this light and are not to be understood as admissions about what is prior art or what is not prior art.

Multimode optical fibers have been known for a long time. Herein, a multimode optical fiber is an optical fiber that has two or more optical propagating modes at a single wavelength where two of the optical propagating modes have different group velocities. In a radially symmetric multimode optical fiber, optical propagating modes with different radial, light-intensity profiles typically have different group velocities. But, some values of the group velocity may be associated with multiple optical propagating modes in such a multimode optical fiber. For example, an axially symmetric multimode optical fiber may have a set of optical propagating modes with the same radial light intensity profile and orthogonal polarization distributions and/or angular momenta of opposite sign. The different modes of such a set may have the same group velocity in the axially symmetric multimode optical fiber.

In recent years, some research has targeted the use of multimode optical fiber to optically transmit a higher data rate than a single mode optical fiber. In particular, in a multimode optical fiber, different optical propagating modes may carry different data streams. For example, the use of different optical propagating modes to carry different data streams may enable an increase of the data rate per wavelength channel over the data rate in many single mode optical fibers.

BRIEF SUMMARY OF SOME EMBODIMENTS

In some embodiments, a first apparatus includes a multimode optical fiber having a selected plurality of optical propagating modes. The selected plurality may be a proper subset of the optical propagating modes of the multi-mode optical fiber or may be all of the optical propagating modes of the multi-mode optical fiber. Each optical propagating mode of the selected plurality has a group velocity that varies over a corresponding range for light in, at least, one of the optical telecommunications C-band, the optical telecommunications L-band, and the optical telecommunications S-band. The ranges corresponding to different ones of the modes of the selected plurality are non-overlapping. The ranges of a group velocity-adjacent pair of the ranges are separated by a nonzero gap of less than about 10,000 meters per second.

In some embodiments of the first apparatus, the gap may be larger than or equal to about 500 meters per second and/or may be less than or equal to about 5,000 meters per second. In some such embodiments, the gap may be less than or equal to about 2,500 meters per second.

In any of the above embodiments of the first apparatus, the optical fiber may be a silica glass optical fiber.

In any of the above embodiments of the first apparatus, the optical fiber may have an optical core with a graded optical refractive index.

In any of the above embodiments of the first apparatus, the optical fiber may be a depressed-index cladding type of optical fiber.

In any of the above embodiments of the first apparatus, the selected plurality may include, at least, three of the optical propagating modes. In some such embodiments, group velocity-adjacent pairs of the ranges corresponding to the three of the modes are separated by gaps that are larger than or equal to about 500 meters per second and/or are less than or equal to about 5,000 meters per second. In some such embodiments, the optical fiber may be a depressed-index cladding type of optical fiber.

In some embodiments, a second apparatus includes a 1×M optical mode demultiplexer, a M×1 optical mode multiplexer, and M optical waveguides. The 1×M optical mode demultiplexer is configured to mode-selectively route light received from each optical propagating mode of a first set thereof in a multimode optical fiber from an optical input of the optical mode demultiplexer to a corresponding one of M optical outputs of the optical mode demultiplexer. The M×1 optical mode multiplexer is configured to mode-selectively route light to each optical propagating mode of a second set thereof in a second multimode optical fiber to an optical output of the optical mode multiplexer from a corresponding one of M optical inputs of the optical mode multiplexer. Each of the M optical waveguides optically connects one of the M optical outputs of the optical mode demultiplexer to a corresponding one of the M optical inputs of the optical mode multiplexer.

In some embodiments of the second apparatus, different ones of the M optical waveguides may have different optical path lengths.

In any of the above embodiments of the second apparatus, the M optical waveguides may be single-mode optical waveguides.

In any of the above embodiments of the second apparatus, the optical waveguides may be configured to, at least, partially compensate relative group delays produced by carrying light signals over a segment of the first multimode optical fiber via different ones of the optical propagating modes therein.

In any of the above embodiments of the second apparatus, some of the M optical waveguides may be configured to provide dispersion compensation.

In some embodiments, a third apparatus includes a series of spans of multimode optical fiber and a plurality of differential group delay compensators. Each compensator end-connects adjacent ends of a corresponding pair of the spans of multimode optical fiber such that the spans and the compensators form a segment of a multimode optical link. Each differential group delay compensator is configured to compensate for relative temporal delays caused by carrying data on different ones of the optical propagating modes of one of the spans of multimode optical fibers of the pair corresponding to the each differential group delay compensator.

In some embodiments of the third apparatus, each span of multimode optical fiber may be such that each optical propagating mode of a selected plurality therein has a group velocity whose value varies over a corresponding range for light in one of the optical telecommunications C-band, L-band, and S-band. The ranges corresponding to group velocity-adjacent ones of the ranges are separated by non-zero gaps. Some or all of the gaps are less than or equal to about 10,000 meters per second.

In any of the above embodiments of the third apparatus, some or all of the gaps may be less than or equal to about 5,000 meters per second and/or greater than or equal to about 500 meters per second.

In any of the above embodiments of the third apparatus, one of the differential group delay compensators may include a 1×M optical demultiplexer for optical propagating modes of a multimode optical fiber, a M×1 optical mode multiplexer for optical propagating modes of a multimode optical fiber, and M optical waveguides. Each of the M optical waveguides optically connects one of the M optical outputs of the optical mode demultiplexer to a corresponding one of the M optical inputs of the optical mode multiplexer. In such embodiments of the third apparatus, different ones of the optical waveguides may have different optical path lengths.

In some embodiments, a method includes for each wavelength channel of a sequence, mode-multiplexing light of N separate data-modulated optical carriers onto N corresponding optical propagating modes of a multi-mode optical fiber or mode-demultiplexing light from the N modes to N corresponding separate data-modulated optical carriers. Here, largest and smallest center wavelengths of the wavelength channels of the sequence define an interval spanning at least, one of the optical telecommunications C-band, the optical telecommunications L-band, and the optical telecommunications S-band. Each mode has a group velocity whose limit values over the interval define a mode-band. Group velocity-neighboring pairs of the mode-bands are non-overlapping and separated by a nonzero gap of less than about 10,000 meters per second.

In any of the above embodiments of a method, some or all of the gaps between group velocity-neighboring pairs of the modes may be less than or equal to about 5,000 meters per second and/or greater than or equal to about 500 meters per second.

In some embodiments of the above method, the method may further include optically compensating the light to remove differential mode delay produced by propagating of the light through the multi-mode optical fiber.

In some embodiments of the above method, the interval may span, at least, at least, the optical telecommunications C and L bands or spans, at least, the optical telecommunications C and S bands.

BRIEF DESCRIPTION OF THE FIGURES

FIG. 3 schematically illustrates group velocities of optical propagating modes of some examples of MMFs, e.g., according to one or more of FIGS. 1, 2A, 2B, and/or 2C;

FIG. 6 illustrates a method of operating a segment of an optical communication system, e.g., a segment of the system illustrated in FIG. 4.

In the Figures and text like reference numbers refer to functionally and/or structurally similar elements.

In the Figures, the relative dimensions of some features may be exaggerated to more clearly illustrate apparatus therein.

Herein, various embodiments are described more fully by the Figures and the Detailed Description of Illustrative Embodiments. Nevertheless, the inventions may be embodied in various forms and are not limited to the specific embodiments described in the Figures and the Detailed Description of the Illustrative Embodiments.

DESCRIPTION OF THE ILLUSTRATIVE EMBODIMENTS

Figure 1:
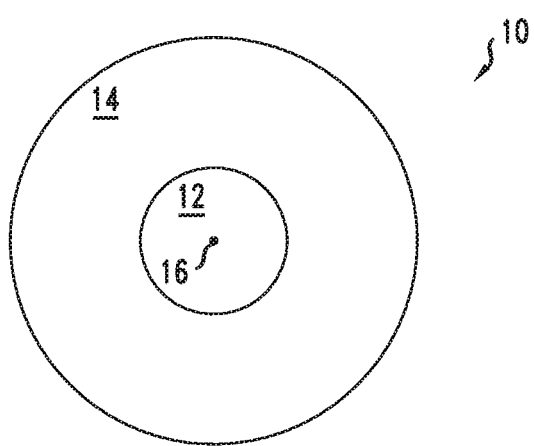
FIG. 1 illustrates a cross-sectional view of a multimode optical fiber (MMF)

Herein, optical telecommunications C, L, and S-Bands are conventionally defined wavelength bands for wavelength-division multiplexing (WDM) optical communications. The optical telecommunications C-band typically refers to a band from about 1530 nanometers to 1565 about nanometers. The optical telecommunications L-band typically refers to a band from about 1565 nanometers to about 1625 nanometers. The optical telecommunications S-band typically refers to a band from about 1460 nanometers to about 1530 nanometers FIG. 1 is a cross-sectional view of a multimode optical fiber (MMF) 10, e.g., an axially symmetric MMF of silica glass. The MMF 10 includes an optical core 12, e.g., of doped or undoped silica glass, and an adjacent, surrounding, and in contact optical cladding 14, e.g., of differently doped or undoped silica glass. The optical core 12 has a higher optical refractive index than the optical cladding 14. The optical core 12 and/or the optical cladding 14 may have optical refractive index(es) that change(s) with radial distance from the axis 16 of the optical fiber 10.

Figure 2A:
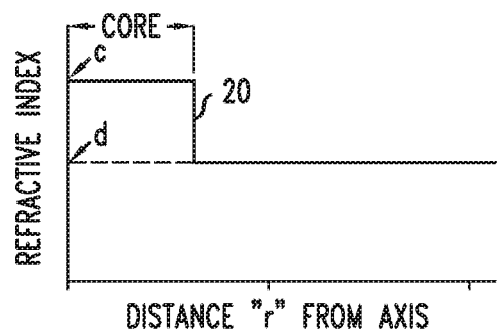
FIGS. 2A-2C illustrate radial profiles of the optical refractive index in various examples of MMFs, e.g., MMFs according to FIG. 1.
Figure 2B:
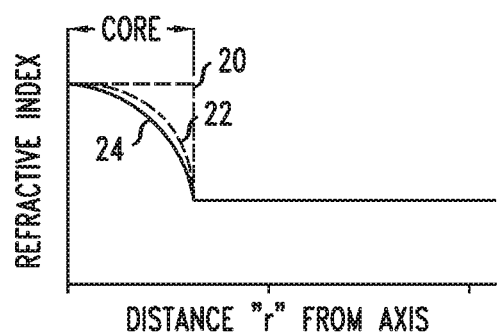
Figure 2C:
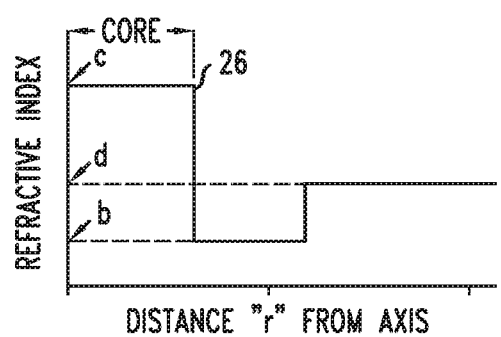

FIGS. 2A-2C schematically illustrate radial profiles of the optical refractive index, i.e., profiles perpendicular to the MMFs' axes, for various examples of MMFs, e.g., the MMF of FIG. 1.

FIG. 2A illustrates, by a curve 20, an example for a radial profile of the optical refractive index in a simple step profile MMF. In the simple step profile MMF, the optical refractive index has a first constant value, c, in the optical core and has a second lower constant value, d, in the optical cladding. That is, the refractive index has values that do not vary with distance "r" from the MMF's axis inside the core and the cladding, respectively. In such an MMF, the optical core may be, e.g., wider than the optical core of a single mode optical fiber of the same core and cladding compositions to support multiple optical propagating modes with different group velocities at a given wavelength of the propagating light.

FIG. 2C schematically illustrates, by a curve 26, an example for a radial profile of the optical refractive index in a complex step profile MMF. In the complex step profile MMF, the optical refractive index may have a first constant value, c, in the optical core, and have a value in the optical cladding that varies with distance "r" from the MMF's axis. In the optical cladding, the optical refractive index has, e.g., a first constant value, b, in an annular cladding region next to the optical core, and has, e.g., a different higher constant value, d, outside of the annular cladding region next to the optical core. Furthermore, the various values c, b, and d of the optical refractive index obey the following relations: c>b, c>d, and d>b. Since the annular cladding region that abuts the optical core has a lower value b for the optical refractive index than more distant regions of the optical cladding, such an MMF will be referred to as a depressed-index cladding MMF.

In the depressed-index cladding MMF, the optical core and the optical cladding have sizes and optical refractive indexes that are selected to support optical propagating modes with different group velocities at a given wavelength of the propagating light.

FIG. 2B schematically illustrates by dashed and solid curves 22, 24 two examples of radial profiles for the optical refractive index of different graded-index MMFs. In the graded-index MMFs, the optical refractive index has a value that varies with distance "r" from the axis of the optical core. The optical refractive index is larger in the optical core than in the surrounding annular region of the optical cladding and may be larger in the optical core than in any part of the optical cladding (e.g., as illustrated in the curves 22, 24).

In such graded-index MMFs, radial profiles of the optical refractive index may be selected to support optical propagating modes with different group velocities at a given wavelength of the propagating light. Indeed, different radial profiles of the optical refractive index may be available to support embodiments of MMFs as schematically illustrated. For example, the profile may have a quadratic or parabolic dependency on distance "r" from the MMF's axis, e.g., as schematically illustrated in the curve 24. Alternately, the index profile of the core may have another "r" dependency, as schematically illustrated in the curve 22, wherein the index profile interpolates between the quadratic or parabolic core profile of the curve 24 and the constant core profile as illustrated of the curve 20 in FIGS. 2A and 2B. Such an interpolating core index profile may produce an MMF that supports a set of optical propagating modes with different group velocities at a given wavelength of the propagating light.

FIG. 3 schematically illustrates, by spectral curves 30, 32, 34, group velocities of exemplary sets of optical propagating modes A, B, and C for some embodiments of MMFs, e.g., as illustrated in FIG. 1. The corresponding MMF may have an optical refractive index profile that is symmetric about the axis of the MMF, e.g., as in FIGS. 2A, 2B, and/or 2C. The A modes have group velocities distributed on the spectral curve 30, e.g., about evenly distributed, the B modes have group velocities distributed on the spectral curve 32, e.g., about evenly distributed, and the C modes have group velocities distributed on the spectral curve 34, e.g., about evenly distributed. For each individual spectral curve 30, 32, 34, the corresponding set of optical propagating modes typically has a common or substantially similar radial, light-intensity profile for which the group velocity lies in a corresponding band or range. In each such band or range, the common group velocity of the one or more optical propagating modes thereof change(s) with the wavelength of the propagating light. Over each such band or range, the change of the common group velocity of the set is preferably and/or typically monotonic with wavelength and even, may be approximately linear with the wavelength as schematically illustrated in the spectral curves 30, 32, 34. Different ones of the mode-bands or ranges of group velocities, e.g., the mode-bands of modes A-C, are non-overlapping in values of the group velocity over a large wavelength region, e.g., over, at least, about the entire optical communications C-band, about the entire optical communications L-band, or about the entire optical communications S band. Indeed, the wavelength interval for which the mode-bands or ranges are non-overlapping may even include about the entire optical communications C and L bands, about the entire optical communications C and S bands, or about the entire optical communications C, L, and S bands. In particular, ones of the mode-bands or ranges, which are neighboring in group velocity ranges, are separated by nonzero gaps, e.g., the gaps 1 and 2 in the values of the group velocity, for light in a large selected wavelength range.

Such example gaps between adjacent ones of the bands, e.g., the gaps 1 and 2, are nonzero and are often relatively small. In the presence of such nonzero gaps, the optical propagating modes of two group velocity-neighboring mode-bands will have differing group velocities over the entire optical communication range of wavelengths, e.g., about the entire C-band; about the entire L-band, about the entire S-band; about the entire combination of the L and C bands; about the entire combination of the S and C bands; or about the entire combination of the S, L, and C bands. Due to the differing group velocities of the optical propagating modes of such neighboring bands, inter-mode optical crosstalk and/or inter-mode nonlinear optical effects typically should tend to be significantly averaged out as light signals propagate along the length of a transmission span of MMF. Such temporal averaging typically should reduce distortions caused by undesirable inter-mode optical interactions during propagation, i.e., if data is carried at different velocities in such adjacent bands over the entire used, wavelength range for such optical communications.

Such temporal averaging during propagation in the MMF will however, typically leave some residual inter-mode crosstalk in a received data-modulated optical carrier. For that reason, an optical receiver may be configured to perform further processing that reduces the amount of inter-mode optical crosstalk, e.g., in the received data-modulated optical carrier. Such further processing may include passing the received data-modulated optical carrier or a coherently down-mixed optical or electrical signal there from through an optical and/or electrical equalizer. The equalizer(s) will mix the received data-modulated optical carrier or the optically or down-mixed electrical or optical signal there from with relatively temporally delayed portions of the same optical carrier or electrically or optically down-mixed signal there from. To perform such mixing, the equalizer(s) will typically store the portions of the optical carrier or the electrically or optically down-mixed signal there from over a temporal period comparable in size to the relative delay between portions of data-modulated optical carriers that cause substantial inter-mode optical crosstalk during optical propagation in the MMF. For this reason, it is typically advantageous to ensure that the relative temporal delay between such cross-talking portions of the data-modulated optical carrier of different optical propagating modes not become too large.

As an example, a wavelength-division multiplexed (WDM) system, in which the example per-mode data rate is about 100 giga bits per second (Gb/s), might have an example optical channel spacing of about 50 giga Hertz, i.e., about 0.4 nm for the optical communications C-band light with a wavelength of about 1,550 nm. Such a WDM system may use optical transmission fibers in which the dispersion is, e.g., about 17 pico-seconds per nanometer per kilometer (ps/(nm-km)). For such a WDM system, substantial inter-mode cross-talk might occur between a given optical wavelength channel and about 4 nearby optical wavelength channels over an optical fiber span with a conventional length of, e.g., 70-120 kilometers. That is, such inter-mode cross-talk may be substantial between the optical wavelength channel and about four of the wavelength channels that are nearest in wavelength for one side or both sides of the given wavelength channel, e.g., 4 longer and wavelength channels, 4 shorter wavelength channels, or 2 longer wavelength channels and 2 shorter wavelength channels. Thus, to substantially reduce or eliminate inter-mode optical crosstalk produced in the given channel by one MMF span of such an example, it may be desirable that a group velocity of two optical propagating modes differ by, at least, the difference in group velocity between an optical wavelength channel and its fourth nearest neighbor optical wavelength channel. Thus, the gap between the inverse of the group velocity between adjacent bands of optical propagating modes should be, at least, about equal to the inverse of 4×0.4 nm×17 ps/(nm-km). Since the magnitude of the gap in group velocities of adjacent bands is the size of the gap in the inverse of the group velocities of said bands times the square of an average group velocity at the gap, the gap in group velocity itself for such adjacent bands is about 1,200 meters/second if the effective refractive index of the MMF is about 1.45.

In various MMFs, such gaps in group velocities between adjacent mode-bands may have somewhat different values without eliminating desired properties of the MMFs, e.g., the averaging of inter-mode interactions without the production of inconveniently large accumulated group delays between crosstalking optical propagating modes. For that reason, in various WDM systems, the inter-mode gaps in group velocities, as schematically illustrated in FIG. 3, e.g., gaps 1 and 2, may have values of 10,000 meters per second or less, preferably have values of 5,000 meters per second or less, and may have values of 2,500 meters per second or less. To maintain adequate averaging of undesired inter-mode interactions over a typical span, such gaps in group velocity between adjacent mode-bands would typically be, at least, at large as about 500 meters per second.

The inventors believe that an MMF, whose spectral characteristics qualitatively correspond to those illustrated in FIG. 3, may be fabricated in different ways. For example, the inventors believe that a graded-index core MMF, e.g., as illustrated in FIG. 2B, or a depressed-index cladding MMF, e.g., as illustrated in FIG. 2C, can be fabricated to have optical characteristics as schematically illustrated in FIG. 3.

To further describe a design of a suitable graded index-core type of optical fiber, the inventors describe herein some properties of conventional MMFs. A conventional step-index MMF with a few different optical propagating modes, e.g., an MMF whose optical refractive index profile is illustrated in FIG. 2A, will typically have a large gap between adjacent mode-bands, i.e., mode-band(s) at nearby values of group velocities. That is, in such an MMF, the gaps 1 and 2 of FIG. 3 would typically be much larger than desired so that using such an MMF would usually also require use of an equalizer with a large temporal buffer in an optical receiver. In contrast, a quadratic graded-index core type of MMF, e.g., an MMF whose optical refractive index profile 24 is illustrated in FIG. 2B, would typically have modal bands that overlap strongly in group velocity, e.g., over a wavelength range of the size of the optical communication C-band. Thus, the optical refractive index profiles of the curve 20 and the curve 24, respectively, of FIG. 2B would be expected to produce MMFs in which the gaps 1 and 2 between adjacent mode bands of FIG. 3 are too large and too small, respectively. Since such gaps will smoothly change, in size, as the optical refractive index profile of an MMF is gradually changed, a smooth interpolation of the optical refractive index profile of an MFF between that of the curve 24 and that of the curve 20 in FIG. 2A will typically pass through a optical refractive index profile for which the sizes of gaps 1 and 2 between bands of group velocity-adjacent optical propagating modes are positive and are not unacceptably large over the entire optical communications C-band, possibly the entire optical communications C and L bands, or even possibly the entire optical communications C, L, and S bands.

In light of the above disclosure, the inventors believe that a depressed-index cladding type of MMF, e.g., having an optical refractive index profile as in FIG. 2C, can also be designed to have a spectrum of bands of different optical propagating modes as schematically illustrated in FIG. 3. Indeed, a suitable form for such an MMF could probably be found by interpolating the optical refractive index profile away from that of the step-index type of MMF of FIG. 2A, which typically produces a distribution of bands of optical propagating modes for which inter-band gaps are too large.

Based on the above disclosure, a person of ordinary skill in the optical fiber arts would be able to easily design other radial, optical refractive index profiles for MMFs having distributions of group velocities as schematically illustrated in FIG. 3. For example, some such other MMFs might have radially graded refractive-index profiles and/or depressed-index cladding profiles. Nevertheless, MMFs having optical transmission characteristics as schematically illustrated in FIG. 3 are believed to be broader than these types of optical refractive index profiles.

Figure 4:
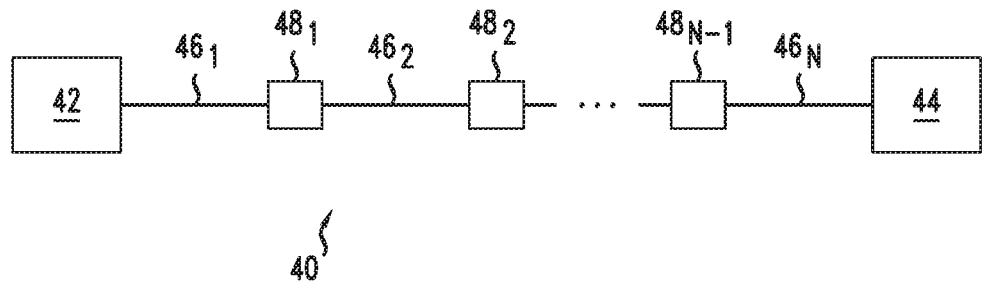
FIG. 4 schematically illustrates an optical communication system that uses multiple optical propagating modes, e.g., in MMF(s) illustrated by one or more of FIGS. 1, 2A, 2B, 2C, and 3.

FIG. 4 illustrates an optical communication system 40 that includes an optical transmitter 42, an optical receiver 44, and a sequence of N MMF spans $46_1$, $46_2$, ..., $46_N$ optically end-coupling the optical transmitter 42 to the optical receiver 44. Some or all of the MFF spans $46_1$-$46_N$ may end-connect to a corresponding differential group delay compensator (DGDC) $48_1$, $48_2$, ..., $48_N$.

The optical transmitter 42 transmits, e.g., in parallel, a plurality of data-modulated optical carriers to the first end of the sequence of MMF spans $46_1$-$46_N$. In some embodiments, the optical transmitter 42 may include an optical mode-multiplexer that enables the transmission of differently data-modulated optical carriers to and/or via different ones of the optical propagating modes of the MMF spans $46_1$-$46_N$. The optical transmitter 42 may be configured to transmit data to some of the optical propagating modes of the MMF spans $46_1$-$46_N$ via one or more optical wavelength channels. For that reason, the optical transmitter 42 may also include wavelength multiplexers, e.g., coupled to the inputs of the optical mode-multiplexer. Thus, on individual optical propagating modes of the MMF spans $46_1$-$46_N$, the optical transmitter 42 may be configured to transmit data over one or more wavelength channels. Indeed, the optical transmitter 42 may be able to transmit separated optical data streams to a plurality of optical propagating modes and a plurality of wavelength channels therein.

The optical receiver 44 receives a plurality of the data-modulated optical carriers from the second end of the sequence of MMF spans $46_1$-$46_N$. In some embodiments, the optical receiver 44 may include an optical mode-demultiplexer that can separate the data-modulated optical carriers carried by different ones of the optical propagating modes of the MMF spans $46_1$-$46_N$. The optical receiver 44 may be configured to receive data from one or more optical wavelength channels of some of the optical propagating modes of the MMF spans $46_1$-$46_N$. That is, from individual optical propagating modes of the MMF spans $46_1$-$46_N$, the optical receiver 44 may be configured to receive data from one or more wavelength channels. Indeed, the optical receiver 44 may be able to receive optical data streams from a plurality of optical propagating modes and a plurality of wavelength channels.

In some embodiments, the optical transmitter 42 and/or optical receiver 44 may be optical components, which are configured to perform other optical network functions. For example, one or both of the optical transmitter 42 and the optical receiver 44 may be an optical add-drop multiplexer or an optical cross-connect of an optical fiber network. In such embodiments, the optical transmitter 42 and receiver 44 may transmit and receive, respectively, optical data streams via multiple optical propagating modes of the optical link, which is formed by the sequence of MMF spans $46_1$-$46_N$. In such embodiments, the optical communication system 40 may be part of a larger WDM optical network, e.g., an optical network having a complex topology, e.g., a mesh network having some node(s) connecting directly ends of three or more MMF spans (not shown).

In other embodiments, one or both of the optical transmitter 42 and the optical receiver 44 may communicate over the sequence of MMF spans $46_1$-$46_N$ or a sub-sequence thereof by a more limited number of optical propagating mode(s) and/or wavelength channel(s) of the sequence or sub-sequence. In such embodiments, the optical transmitter 42 and/or the optical receiver 44 may perform the modulation and/or demodulation of data between electrical data stream(s) and optical data-modulated carrier(s). In such embodiments, the optical transmitter 42 and/or the optical receiver 44 may include conventional data modulator(s), wavelength multiplexer(s) and/or demultiplexer(s), and/or optical mode-multiplexer(s) and/or demultiplexer(s).

The sequence of MMF spans $46_1$-$46_N$ or a subsequence thereof forms a WDM optical link that supports multiple optical propagating modes and/or wavelength channels. Some or all of the MMF spans $46_1$-$46_N$ may include, e.g., an MMF as illustrated by FIG. 3, e.g., an MMF as in FIGS. 1, 2B, and/or 2C. Adjacent pairs of some or all of the MMF span $46_1$-$46_N$ may be optically end-connected via a differential group delay compensator (DGDC) $48_1$, $48_2$, . . . , $48_{N-1}$. Each DGDC $48_1$-$48_{N-1}$ partially or completely compensates the relative time delays produced between data symbols that are transmitted via different optical propagating modes over one of the MMF spans $46_1$-$46_N$, e.g., one or both of the MMF $46_1$-$46_N$ spans neighboring and directly connected to the same DGDC $48_1$-$48_{N-1}$. In alternate embodiments, the DGDCs $48_1$-$48_{N-1}$ may be configured to partially or completely pre-compensate for differential inter-mode group velocity delay that will be generated by carrying data in the next MMF span $46_1$-$46_N$ and/or to partially or completely post-compensating for inter-mode group velocity delay that was generated in the previous MMF span $46_1$-$46_N$ directly end-connected thereto.

In some embodiments, the DGDCs $48_1$-$48_{N-1}$ may optionally provide optical amplification and/or optical dispersion compensation.

Figure 5:
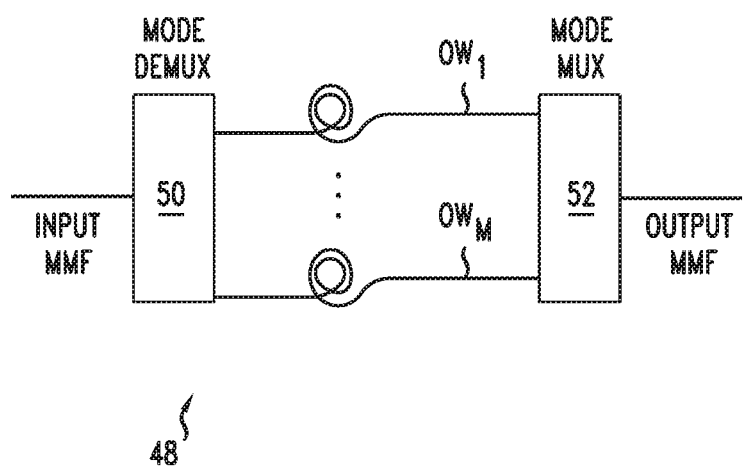
FIG. 5 schematically illustrates a device for adjusting the group delay between different optical propagating modes, e.g., in the system of FIG. 4.

FIG. 5 illustrates one embodiment 48 of a DGDC, e.g., useable as any of the DGDCs $48_1$-$48_{N-1}$ of FIG. 4. The DGDC 48 includes a 1×M optical-propagating-mode demultiplexer 50, an M×1 optical-propagating-mode multiplexer 52, and an array of M optical waveguides $OW_1, \ldots, OW_M$.

The optical input of the 1×M optical-propagating-mode demultiplexer 50 may connect to an adjacent output end of an input MMF, e.g., one of MMF spans $46_1$-$46_N$ of FIG. 4. The optical output of the M×1 optical-propagating-mode multiplexer 52 may connect to an adjacent input end of an output MMF, e.g., the sequentially next MMF span $46_1$-$46_N$ of FIG. 4. Each optical waveguide $OW_1$-$OW_M$ end-connects one of the optical outputs of the 1×M optical-propagating-mode demultiplexer 50 to a corresponding one of the optical inputs of the M×1 optical-propagating-mode multiplexer 52.

In the DGDC 48, individual ones of the M optical waveguides $OW_1$-$OW_M$ may be optical fibers or optical waveguides, e.g., single-mode optical fibers or waveguides. The individual optical waveguides $OW_1$-$OW_M$ typically have different optical path lengths, and the optical path lengths of the optical waveguides $OW_1$-$OW_M$ may be configured to fully or partially compensate relative delays produced by transmitting data streams via different ones of the optical propagating modes in the connected MMF span(s). As an example, if the K-th optical propagating mode has a larger group velocity than the J-th optical propagating mode in the MMF(s), the optical waveguides $OW_K$ for the K-th mode would typically be longer than the optical waveguides $OW_J$ for the J-th mode. In such an example, the difference in optical path lengths of the J-th and K-th optical waveguides $OW_J$ and $OW_K$ may be configured, e.g., to approximately post-compensate or pre-compensate for relative delay(s) between light data streams carried by the respective J-th and K-th optical propagating modes, wherein the relative delay(s) is due to propagation through a MMF physically connected to the respective input or output of the DGDC 48.

In various embodiments, the optical propagating-mode-multiplexer 50 and optical propagating-mode-demultiplexer 52 may have a conventional form or may have another form. Examples of suitable constructions for the optical propagating-mode-multiplexer 50 and the optical propagating-mode-demultiplexer 52 may be described in one or more of U.S. patent application Ser. No. 13/200,072, filed Sep. 16, 2011 by Roland Ryf et al; U.S. patent application Ser. No. 12/827,284, filed Jun. 30, 2010 by Roland Ryf et al; U.S. patent application Ser. No. 12/492,391, filed Jun. 26, 2009 by Roland Ryf et al; U.S. patent application Ser. No. 12/986,468, filed Jan. 7, 2011 by Roland Ryf et al; and U.S. patent application Ser. No. 12/827,641, filed Jun. 30, 2010 by Roland Ryf et al. All of the above patent applications are incorporated herein by reference in their entirety.

FIG. 6 schematically illustrates one example of a method 60 for operating part of a WDM optical communication system that uses multimode optical transmission fibers, e.g., a segment of the system 40 of FIG. 4.

For each optical wavelength channel of a sequence, the method 60 includes optical mode-multiplexing light of Q separate data-modulated optical carriers onto a preselected set of Q corresponding optical propagating modes of a MMF and/or optical mode-demultiplexing light from the Q modes to the corresponding separate data-modulated optical carriers (step 62). Here, the integer Q is greater than or equal to 2, and the preselected set of Q optical propagating modes are relatively orthogonal. The optical mode-multiplexing or optical mode-demultiplexing may be performed approximately with respect to the Q optical propagating modes. Such optical mode-multiplexing may be performed, e.g., near an input end of the sequence of MMF spans $46_1$-$46_N$, i.e., by the optical transmitter 42 of FIG. 4. Such optical mode-demultiplexing may be performed, e.g., near an output end of the sequence of MMF spans $46_1$-$46_N$, i.e., by the optical receiver 44 of FIG. 4.

Over the sequence of optical wavelength channels, e.g., a WDM sequence, the group velocity of each optical propagating mode of the preselected set traces out a corresponding spectral curve that typically varies monotonic with wavelength. Each of the spectral curves corresponds to a mode-band of the group velocities.

Different ones of the mode-bands do not overlap and are separated by nonzero gaps over a preselected wavelength interval, e.g., as illustrated in FIG. 3. The preselected wavelength interval has boundaries defined by the largest and lowest center wavelengths of the wavelength channels of the sequence. The preselected wavelength interval includes, e.g., ½ or one of the optical telecommunications C, L, and S bands. The preselected wavelength interval typically includes, e.g., approximately one of the optical telecommunications C, L, and S bands. The preselected wavelength interval may include the optical telecommunications C and L bands or the optical telecommunications C band and S bands, or may include the optical telecommunications C, L, and S bands.

In the preselected wavelength interval, each mode has a group velocity whose limit values define the boundaries of the mode-band. The mode-bands are separated by nonzero gaps, which may be relatively small, e.g., as previously described. For example, each group velocity-neighboring pair of the mode-bands may be separated by a gap of less than about 100 meters per pico-second. Since each such gap is nonzero, the N different optical propagating modes will typically have different group velocities over the entire wavelength interval preselected for WDM optical communications.

The method 60 may also include propagating the light of the step 62 through the length of the MMF (step 64). Here, the length of the MMF may include one or more of the N MMF spans $46_1$-$46_N$.

Optionally, the method 60 may include optically compensating the light to remove differential mode delay produced by propagation through the length of the MMF via the Q different optical propagating modes (step 66). The differential mode delay results from the different velocities of the Q optical propagating modes in the MMF. Such differential group delay may be partially or completely removed, e.g., by processing the light in one or more of the DGDCs $48_1$-$48_{N-1}$ of FIG. 4 (step 64). Such compensating may involve post-compensating or pre-compensating for the differential mode delay, e.g., to remove the differential mode delay caused by propagation in one or more of the MMF spans $46_1$-$46_N$ of FIG. 4.

Optionally, the method 60 may involve performing optical mode-multiplexing of WDM light, as described in the step 62; propagating the mode-multiplexed WDM light through the MMF, as described in the step 64; optical compensating differential mode delay produced in said WDM light in the MMF, as described in the step 66, and performing optical mode-demultiplexing of the WDM light, as described in the step 62.

The method 60 may be performed with various variations to produce a multimode optical fiber based WDM optical communication system in which different channels, which are defined by an optical center wavelength and a propagating optical mode, have different group velocities in the multimode optical fiber or sequence of optical transmission spans thereof.

The inventions are intended to include other embodiments that would be obvious to one of skill in the art in light of the description, figures, and claims.

What we claimed is:

1. An apparatus, comprising:
   a series of spans of multimode optical fiber;
   a plurality of differential group delay compensators, each compensator end-connecting adjacent ends of a corresponding pair of the spans of multimode optical fiber such that the spans and the compensators form a segment of a multimode optical link; and wherein:
   each differential group delay compensator is configured to compensate for relative temporal delays caused by carrying data on different ones of the optical propagating modes of one of the spans of multimode optical fibers of the pair corresponding to the each differential group delay compensator, and
   each span of multimode optical fiber is such that each optical propagating mode of a plurality therein has a group velocity whose value varies over a corresponding range for light in one of the optical telecommunications C-band, L-band, and S-band, the ranges of different ones of the modes of the plurality being non-overlapping, at least two group velocity-adjacent pairs of the ranges being separated by nonzero gaps of less than about 10,000 meters per second.

2. An apparatus, comprising:
   a series of spans of multimode optical fiber;
   a plurality of differential group delay compensators, each compensator end-connecting adjacent ends of a corresponding pair of the spans of multimode optical fiber such that the spans and the compensators form a segment of a multimode optical link; and wherein:
   each differential group delay compensator is configured to compensate for relative temporal delays caused by carrying data on different ones of the optical propagating modes of one of the spans of multimode optical fibers of the pair corresponding to the each differential group delay compensator, and
   one of the differential group delay compensators comprises:
   a 1×M optical mode demultiplexer for optical propagating modes of one of the spans of multimode optical fiber;
   a M×1 optical mode multiplexer for optical propagating modes of a sequential next one of the spans of multimode optical fiber; and
   M optical waveguides, each of the M optical waveguides optically connecting one of the optical outputs of the 1×M optical mode demultiplexer to a corresponding one of the optical inputs of the M×1 optical mode multiplexer.

3. The apparatus of claim 2, wherein different ones of the optical waveguides have different optical path lengths.

4. The apparatus of claim 1, wherein each span of multimode optical fiber is such that each optical propagating mode of the plurality therein has a group velocity whose value varies over the corresponding range for light in the optical telecommunications C-band.

5. The apparatus of claim 4, wherein the gaps are between about 500 meters per second and 5,000 meters per second.

6. The apparatus of claim 5, wherein the each span of the multimode optical fiber is a depressed-index cladding type of optical fiber.

7. The apparatus of claim 1, wherein the gaps are between about 500 meters per second and 5,000 meters per second.

8. The apparatus of claim 7, wherein the each span of the multimode optical fiber is a depressed-index cladding type of optical fiber.

9. The apparatus of claim 1, wherein the each span of the multimode optical fiber is a silica glass optical fiber.

10. The apparatus of claim 4, wherein the each span of the multimode optical fiber is a depressed-index cladding type of optical fiber.

* * * * *